US012636641B2

(12) United States Patent
Grabow et al.

(10) Patent No.: US 12,636,641 B2
(45) Date of Patent: May 26, 2026

(54) INHIBITION-FREE LOW-TEMPERATURE ENGINE EXHAUST OXIDATION CATALYST

(71) Applicants: University of Houston System, Houston, TX (US); Oregon State University, Corvallis, OR (US)

(72) Inventors: Lars Christian Grabow, Houston, TX (US); Yuying Song, Columbus, IN (US); Konstantinos Goulas, Corvallis, OR (US); Melanie Hazlett, Toronto (CA); William Epling, Charlottesville, VA (US)

(73) Assignees: University of Houston System, Houston, TX (US); Oregon State University, Corvallis, OR (US)

( * ) Notice: Subject to any disclaimer, the term of this patent is extended or adjusted under 35 U.S.C. 154(b) by 411 days.

(21) Appl. No.: 17/797,739

(22) PCT Filed: Feb. 11, 2021

(86) PCT No.: PCT/US2021/017614
§ 371 (c)(1),
(2) Date: Aug. 5, 2022

(87) PCT Pub. No.: WO2021/163294
PCT Pub. Date: Aug. 19, 2021

(65) Prior Publication Data
US 2023/0074054 A1     Mar. 9, 2023

Related U.S. Application Data

(60) Provisional application No. 62/975,383, filed on Feb. 12, 2020.

(51) Int. Cl.
B01J 21/04 (2006.01)
B01D 53/32 (2006.01)
(Continued)

(52) U.S. Cl.
CPC ........ B01J 23/8926 (2013.01); B01D 53/323 (2013.01); B01D 53/9459 (2013.01); (Continued)

(58) Field of Classification Search
CPC . B01J 21/04; B01J 21/06; B01J 21/063; B01J 21/066; B01J 21/08; B01J 21/10; (Continued)

(56) References Cited

U.S. PATENT DOCUMENTS 3,993,593 A * 11/1976 Kaneko ................... C07C 45/34
502/225
5,464,802 A * 11/1995 Gubitosa ................. C07C 5/05
502/170
(Continued)

FOREIGN PATENT DOCUMENTS

WO        2017015204 A1      1/2017

OTHER PUBLICATIONS

Efremenko et al. "DFT study of small bimetallic palladium-copper clusters", Chemical Physics Letters 401 (2005) 232-240.*
(Continued)

*Primary Examiner* — Cam N. Nguyen
(74) *Attorney, Agent, or Firm* — Carter, DeLuca & Farrell, LLP; George Likourezos; Bret P. Shapiro

(57) ABSTRACT

The present disclosure provides a method for preparing a supported metal alloy catalyst for low temperature engine exhaust oxidation without CO or NO inhibition. The catalyst includes bimetallic PdCu alloy deposited on a SiO$_2$ support using the strong electrostatic adsorption method. The PdCu catalyst may be combined with a traditional PGM-based automotive oxidation catalyst in a series or dual-bed configuration. The first stage of the dual-bed system includes the PdCu catalyst, with the primary role of oxidizing CO at low temperature; the PGM-based catalyst in the second stage
(Continued)

then oxidizes NO and hydrocarbons in the absence of any CO-inhibition effects.

12 Claims, 12 Drawing Sheets

(51) Int. Cl.

| | |
|---|---|
| *B01D 53/94* | (2006.01) |
| *B01J 21/06* | (2006.01) |
| *B01J 21/08* | (2006.01) |
| *B01J 21/10* | (2006.01) |
| *B01J 21/12* | (2006.01) |
| *B01J 21/14* | (2006.01) |
| *B01J 23/04* | (2006.01) |
| *B01J 23/10* | (2006.01) |
| *B01J 23/14* | (2006.01) |
| *B01J 23/42* | (2006.01) |
| *B01J 23/44* | (2006.01) |
| *B01J 23/50* | (2006.01) |
| *B01J 23/52* | (2006.01) |
| *B01J 23/54* | (2006.01) |
| *B01J 23/58* | (2006.01) |
| *B01J 23/63* | (2006.01) |
| *B01J 23/66* | (2006.01) |
| *B01J 23/72* | (2006.01) |
| *B01J 23/76* | (2006.01) |
| *B01J 23/78* | (2006.01) |
| *B01J 23/83* | (2006.01) |
| *B01J 23/835* | (2006.01) |
| *B01J 23/885* | (2006.01) |
| *B01J 23/887* | (2006.01) |
| *B01J 23/89* | (2006.01) |
| *B01J 35/45* | (2024.01) |
| *B01J 37/02* | (2006.01) |
| *B01J 37/12* | (2006.01) |

(52) U.S. Cl.
CPC ........... *B01J 21/06* (2013.01); *B01J 37/0201* (2013.01); *B01J 37/12* (2013.01); *B01D 2255/1023* (2013.01); *B01D 2255/20761* (2013.01); *B01D 2255/40* (2013.01); *B01D 2257/40* (2013.01); *B01D 2257/502* (2013.01); *B01D 2257/702* (2013.01); *B01D 2258/01* (2013.01); *B01J 2523/10* (2013.01); *B01J 2523/31* (2013.01); *B01J 2523/41* (2013.01); *B01J 2523/82* (2013.01)

(58) Field of Classification Search
CPC ..... B01J 21/12; B01J 2/14; B01J 23/04; B01J 23/10; B01J 23/14; B01J 23/42; B01J 23/44; B01J 23/50; B01J 23/52; B01J 23/54; B01J 23/58; B01J 23/626; B01J 23/63; B01J 23/66; B01J 23/682; B01J 23/72; B01J 23/76; B01J 23/78; B01J 23/83; B01J 23/835; B01J 23/885; B01J 23/887; B01J 23/8871; B01J 23/8872; B01J 23/8875; B01J 23/8926; B01J 23/894; B01J 23/8946; B01J 23/8966; B01J 37/0201; B01J 37/12; B01J 2523/10; B01J 2523/31; B01J 2523/41; B01J 2523/82; B01J 35/19; B01J 35/45; B01D 53/323; B01D 53/9459; B01D 2255/1023; B01D 2255/20761; B01D 2255/40; B01D 2257/40; B01D 2257/502;

B01D 2257/702; B01D 2258/01; Y02E 60/50; H01M 4/8825; H01M 4/9041; H01M 4/9075; H01M 4/921; H01M 4/925

USPC ........ 502/300, 330, 332–334, 339, 349–350, 502/355, 415, 439

See application file for complete search history.

(56) References Cited

U.S. PATENT DOCUMENTS

| | | | | |
|---|---|---|---|---|
| 6,015,769 A * | 1/2000 | Wang | ................... | B01J 23/8926 |
| | | | | 502/330 |
| 6,017,847 A * | 1/2000 | Wang | ...................... | B01J 23/52 |
| | | | | 502/330 |
| 6,797,669 B2 * | 9/2004 | Zhang | ...................... | B01J 23/44 |
| | | | | 502/328 |
| 7,307,040 B2 * | 12/2007 | Schlitter | .............. | B01J 23/8926 |
| | | | | 502/332 |
| 8,129,306 B2 * | 3/2012 | Myers | ................... | H01M 4/921 |
| | | | | 502/328 |
| 8,178,463 B2 * | 5/2012 | Stamenkovic | ........ | H01M 4/921 |
| | | | | 420/466 |
| 8,551,411 B2 * | 10/2013 | Fisher | ................. | B01D 53/944 |
| | | | | 422/177 |
| 8,592,339 B2 * | 11/2013 | Fang | ........................ | B01J 37/04 |
| | | | | 502/334 |
| 8,592,340 B2 * | 11/2013 | Trejo | ...................... | B01J 35/19 |
| | | | | 502/159 |
| 8,962,512 B1 * | 2/2015 | Burton | .................... | B01J 21/18 |
| | | | | 502/185 |
| 8,980,104 B2 * | 3/2015 | Sheintuch | ................ | B01J 21/18 |
| | | | | 210/507 |
| 8,986,514 B2 * | 3/2015 | Yamauchi | ................ | B01J 35/39 |
| | | | | 204/157.46 |
| 9,180,434 B2 * | 11/2015 | Bonrath | ................... | B01J 37/08 |
| 9,266,095 B2 * | 2/2016 | Weiner | .................... | B01J 23/44 |
| 9,272,266 B2 * | 3/2016 | Hao | .................. | B01D 53/9436 |
| 9,272,268 B2 | 3/2016 | Toops et al. | | |
| 9,770,705 B2 * | 9/2017 | Murphy | ............... | C07C 51/412 |
| 9,808,790 B2 * | 11/2017 | Murphy | .............. | B01J 37/0248 |
| 9,849,445 B2 * | 12/2017 | Vajda | ...................... | C01B 32/50 |
| 9,878,306 B2 * | 1/2018 | Qin | ...................... | B01J 37/0225 |
| 9,941,521 B2 * | 4/2018 | Kitao | ................... | B01J 35/397 |
| 9,944,587 B2 * | 4/2018 | Xu | ...................... | B01J 23/8953 |
| 9,950,314 B2 * | 4/2018 | Adachi | .................. | B01J 37/348 |
| 9,972,848 B2 * | 5/2018 | Kitao | ................. | H01M 4/8657 |
| 10,061,751 B1 * | 8/2018 | Raghunathan | ........ | G06F 40/154 |
| 10,232,351 B2 * | 3/2019 | Kitao | ................. | B01J 37/0225 |
| 10,286,382 B2 * | 5/2019 | Qin | ...................... | B01J 35/40 |
| 10,305,113 B2 * | 5/2019 | Hori | ................... | H01M 4/8853 |
| 10,497,943 B2 * | 12/2019 | Shao | ...................... | B01J 35/397 |
| 10,800,717 B2 * | 10/2020 | Che | ...................... | B01J 23/628 |
| 10,807,074 B2 * | 10/2020 | Murphy | .................. | B01J 21/08 |
| 10,821,422 B2 * | 11/2020 | Chaudhari | .............. | C07C 51/16 |
| 10,858,302 B2 * | 12/2020 | Chen | ...................... | B01J 37/08 |
| 10,906,033 B2 * | 2/2021 | Hua | .................... | C07D 209/08 |
| 11,596,927 B2 * | 3/2023 | Murphy | ................. | C08G 69/14 |
| 11,738,332 B2 * | 8/2023 | Wu | ......................... | C01B 3/047 |
| | | | | 502/335 |
| 11,766,663 B2 * | 9/2023 | Liu | ........................ | B01J 23/745 |
| | | | | 502/245 |
| 11,976,037 B2 * | 5/2024 | Marras | ...................... | B01J 35/19 |
| 2005/0085031 A1 | 4/2005 | Lopatin et al. | | |
| 2007/0160899 A1 * | 7/2007 | Atanassova | ........... | H01M 4/921 |
| | | | | 429/535 |
| 2009/0325792 A1 | 12/2009 | Oljaca et al. | | |
| 2010/0179056 A1 | 7/2010 | Huang et al. | | |
| 2012/0309615 A1 * | 12/2012 | Shao | ...................... | H01M 4/92 |
| | | | | 502/301 |
| 2013/0059231 A1 * | 3/2013 | Hwang | ............... | H01M 4/9041 |
| | | | | 977/773 |
| 2016/0036065 A1 * | 2/2016 | Hwang | ............... | H01M 4/9041 |
| | | | | 502/185 |

(56) References Cited

U.S. PATENT DOCUMENTS

| 2016/0346763 | A1* | 12/2016 | Wahab | B01J 35/19 |
| 2017/0050897 | A1* | 2/2017 | Idriss | B01J 35/30 |
| 2017/0274364 | A1* | 9/2017 | Idriss | C02F 1/32 |

OTHER PUBLICATIONS

Toshima et al. "Preparation and Catalysis of Novel Colloidal Dispersions of Copper/Noble metal Bimetallic Clusters", American Chemical Society (1994), 10, 4574-4580.*
Toshima et al. "Polymer-Protected Cu/Pd Bimetallic Clusters", Advanced Materials, (1994) 6, No. 3, 245-247.*
Baletto et al. "Growth simulations of silver shells on copper and palladium nanoclusters", Physical Review B 66, 155420-1-155420-11, (2002).*
Subramanian et al. Cu—Pd (Copper-Palladium), Journal of Phase Equilibria, vol. 12, No. 2, (1991), 231-243.*
Du et al. "Synthesis and metal-support interaction of subnanometer copper-palladium bimetallic oxide clusters for catalytic oxidation of carbon monoxide", Inorganic Chemistry, Frontiers, 2017, vol. 4, pp. 668-674.*
First Examination Report issued in Canadian Patent Application No. 3.166.935 dated Jul. 25, 2023.
International Preliminary Report on Patentability issued by the International Bureau of WIPO in connection with International Application No. PCT/US2021/017614, dated Aug. 11, 2022.
Examination Search Report issued by the Canadian Intellectual Property Office in connection with International Application No. 3,166,935, dated Jul. 25, 2023.
Yuying Song et al. "Activity Trends for Catalytic CO and NO Co-Oxidation at Low Temperature Diesel Emission Conditions." Industrial & Engineering Chemistry Research, vol. 57, No. 38, 2018, pp. 12715-12725.
Goulas et al. "Selectivity Tuning over monometallic and bimetallic dehydrogenation catalysts: effects of support and particle size." Catalysis Science & Technology, vol. 8, No. 1, Nov. 22, 2017, pp. 314-327.
International Search Report and Written Opinion dated Jun. 23, 2021 in corresponding International PCT Application No. PCT/US2021/017614 (12 pages).
Extended European Search Report issued in European Patent Application No. EP21753115 dated Feb. 2, 2024.
International Search Report and Written Opinion issued by the International Searching Authority in connection with International Application No. PCT/US21/17614, dated Jun. 23, 2021.

* cited by examiner

| | Pd Edge | | Cu Edge |
|---|---|---|---|
| $N_{Pd-Pd}$ | $5.8 \pm 1.7$ | $N_{Cu-Cu}$ | $3.2 \pm 0.3$ |
| $N_{Pd-Cu}$ | $6.2 \pm 1.7$ | $N_{Cu-Pd}$ | $5.3 \pm 0.4$ |
| $\Delta E_0 (eV)$ | $-5.4 \pm 2.1$ | $\Delta E_0 (eV)$ | $4.5 \pm 0.4$ |
| $R_{Pd-Pd} (\text{Å})$ | $2.693 \pm 0.014$ | $R_{Cu-Cu} (\text{Å})$ | $2.579 \pm 0.009$ |
| $R_{Pd-Cu} (\text{Å})$ | $2.613 \pm 0.009$ | $R_{Cu-Pd} (\text{Å})$ | $2.613 \pm 0.009$ |
| $\sigma_{Pd-Pd}^2 (\times 10^{-4} \text{Å}^{-2})$ | $67 \pm 8$ | $\sigma_{Cu-Cu}^2 (\times 10^{-4} \text{Å}^{-2})$ | $103 \pm 12$ |
| $\sigma_{Pd-Cu}^2 (\times 10^{-4} \text{Å}^{-2})$ | $103 \pm 12$ | $\sigma_{Cu-Pd}^2 (\times 10^{-4} \text{Å}^{-2})$ | |

FIG. 3

PdCu11-500_020.tif
Print Mag: 1250000x @ 7.0 in
17: 35 04/24/18

20 nm
HV= 300kV
Direct Mag: 150000x
AMT Camera System

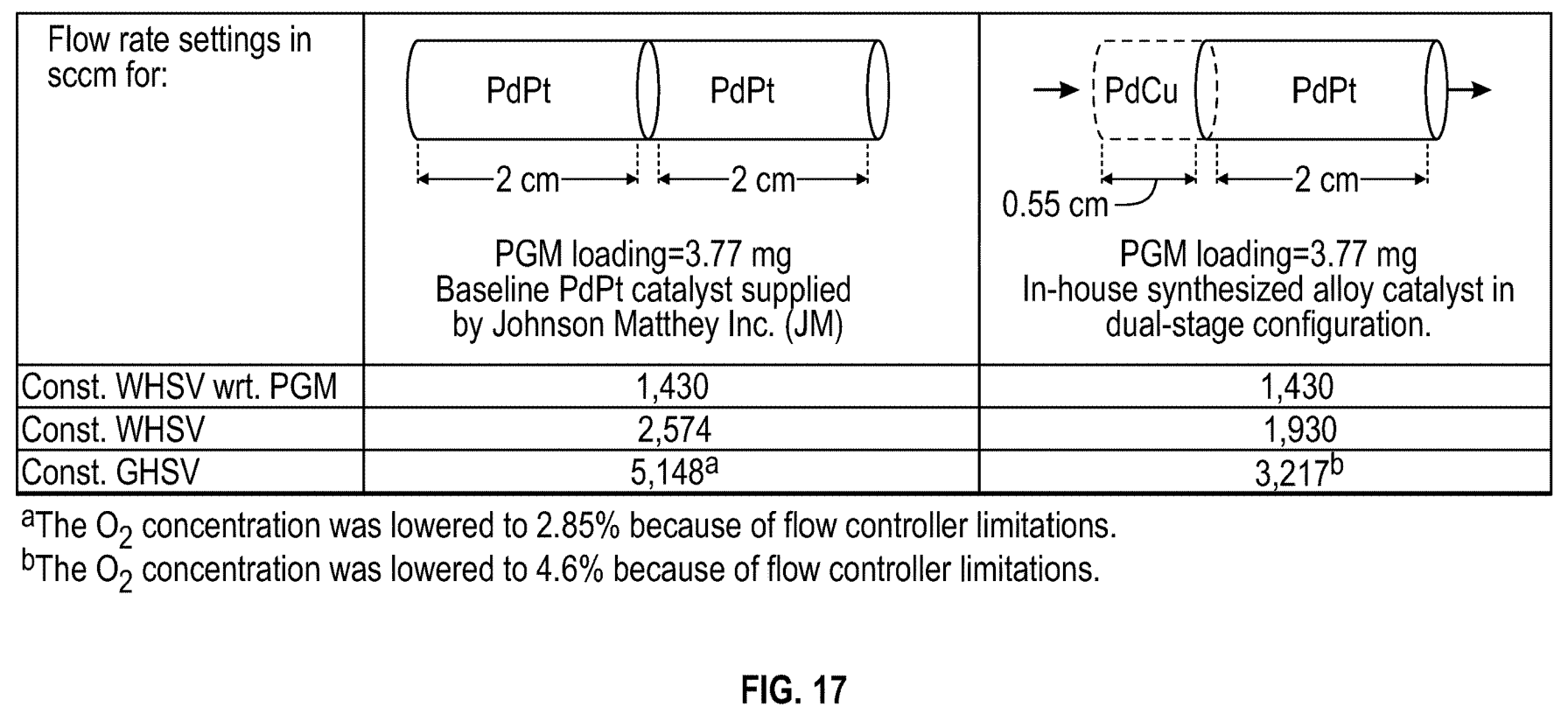

| Flow rate settings in sccm for: | PGM loading=3.77 mg Baseline PdPt catalyst supplied by Johnson Matthey Inc. (JM) | PGM loading=3.77 mg In-house synthesized alloy catalyst in dual-stage configuration. |
|---|---|---|
| Const. WHSV wrt. PGM | 1,430 | 1,430 |
| Const. WHSV | 2,574 | 1,930 |
| Const. GHSV | 5,148[a] | 3,217[b] |

[a]The $O_2$ concentration was lowered to 2.85% because of flow controller limitations.
[b]The $O_2$ concentration was lowered to 4.6% because of flow controller limitations.

FIG. 17

INHIBITION-FREE LOW-TEMPERATURE ENGINE EXHAUST OXIDATION CATALYST

CROSS-REFERENCE TO RELATED APPLICATIONS

This application is a National Stage Application under 35 U.S.C. § 371(a) of U.S. Patent Application No. PCT/US2021/017614, filed on Feb. 11, 2021, which claims the benefit of and priority to U.S. Provisional Patent Application Serial No.: 62/975,383, filed on Feb. 12, 2020, the entire contents of which are incorporated by reference herein.

GOVERNMENT SUPPORT

This invention was made with government support under DE-EE0008233 awarded by the U.S. Department of Energy, and 1258688 awarded by the National Science Foundation. The government has certain rights in the invention.

TECHNICAL FIELD

The present disclosure relates to an inhibition-free oxidation catalyst for the treatment of low-temperature engine exhaust. More specifically, an aspect of the present disclosure provides a method for producing a palladium-copper (PdCu) alloy catalyst and its use in a dual-bed configuration for the low-temperature inhibition-free simultaneous oxidation of carbon monoxide (CO), nitric oxide (NO), and/or unburnt hydrocarbons.

SUMMARY

Aspects of the present disclosure are described in detail with reference to the drawings wherein like reference numerals identify similar or identical elements.

An aspect of the present invention provides a catalyst configured to oxidize CO in the presence and absence of NO, hydrocarbons, and/or water at temperatures lower than 150° C. The catalyst includes palladium (Pd) and copper (Cu) metallic nanoclusters supported on an oxide support.

In an aspect of the present disclosure, Pd and Cu may be alloyed at a ratio of 3:1 to 1:3.

In another aspect of the present disclosure, Pd and Cu may be alloyed at a ratio of 5:1 to 1:5.

In yet another aspect of the present disclosure, Pd and Cu may be alloyed at a ratio of 100:1 to 1:100.

In a further aspect of the present disclosure, the oxide support may include $SiO_2$, $TiO_2$, $ZrO_2$, $CeO_2$, $Al_2O_3$, MgO, $SnO_2$, $Nb_2O_5$, BaO, SrO, $Fe_2O_3$, $Ta_2O_5$, or $La_2O_3$, or any combination thereof.

In yet a further aspect of the present disclosure, Pd may be substituted, partially or entirely, by platinum (Pt).

In an aspect of the present disclosure, Cu may be substituted, partially or entirely, by Ag, or Au, or any combination thereof.

In another aspect of the present disclosure, the catalyst may be prepared by a strong electrostatic adsorption method.

In yet another aspect of the present disclosure, the catalyst may be prepared by an incipient wetness impregnation method.

An aspect of the present disclosure provides a method for preparing an inhibition-free oxidation catalyst. The method includes preparing a bimetallic PdCu catalyst based on an electrostatic adsorption method on a silicon dioxide ($SiO_2$) support (or alumina support).

In an aspect of the present disclosure, the method may further include dissolving palladium nitrate and copper nitrate precursor in water to which the stock ammonium hydroxide solution is added.

In an aspect of the present disclosure, the method may further include mixing silica gel with water and a stock ammonium hydroxide solution and adding the solution of metal ammine nitrate precursors to the silica gel under vigorous stirring.

In an aspect of the present disclosure, the method may further include separating solids from the liquid by vacuum filtration; washing the retentate with water.

In an aspect of the present disclosure, the method may further include drying the retentate under ambient air pressure at about 90° C.

In an aspect of the present disclosure, the method may further include treating portions of the dried solids under flowing air in a tubular furnace.

An aspect of the present disclosure provides a system for removing contaminants from the engine exhaust gas. The system includes a first stage, including a catalyst configured to oxidize CO in the presence and absence of NO, hydrocarbons, and/or water at temperatures lower than 150° C. The catalyst includes Pd, Cu, and/or PdCu bimetallic nanoclusters supported on an oxide support; and a second stage including a catalyst configured to oxidize NO and unburnt hydrocarbons at a temperature range from 20° C. to 1000° C.

In a further aspect of the present disclosure, the second stage catalyst may include a PdPt bimetallic catalyst.

In yet a further aspect of the present disclosure, the second stage catalyst may include a $PdPt/SiO_2$ catalyst and/or a PdPt/alumina catalyst.

In yet a further aspect of the present disclosure, Pd and Cu may be alloyed at a ratio of 3:1 to 1:3.

Further details and aspects of exemplary aspects of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which:

FIG. 3 is a table showing Extended X-Ray Absorption Fine Structure Spectrum (EXAFS) fits of reduced $PdCu/SiO_2$ catalyst, in accordance with the present disclosure;

FIG. 17 is a table depicting flow rate settings for the reactors of FIGS. 13A and 13B.

Figure 1:
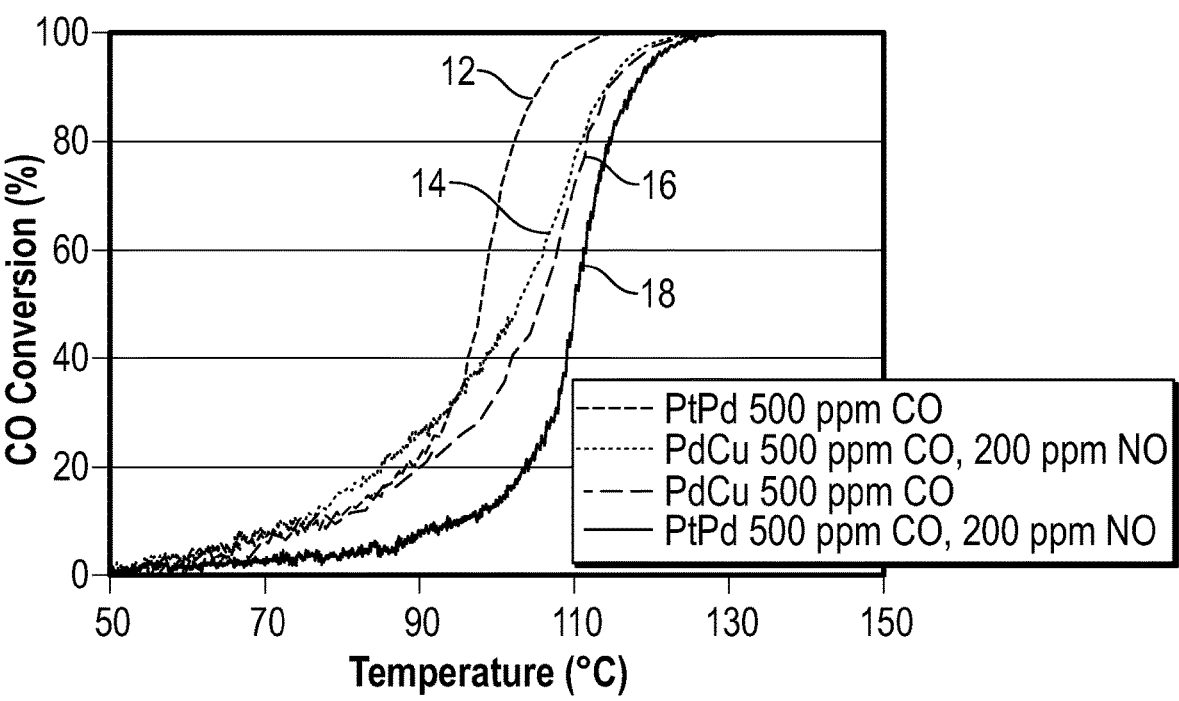
FIG. 1 is a graph of CO conversion over $PdCu/SiO_2$ and $PtPd/SiO_2$ catalysts, in accordance with the present disclosure.

Further details and aspects of various aspects of the present disclosure are described in more detail below with reference to the appended figures.

DETAILED DESCRIPTION

This disclosure relates to systems and methods for inhibition-free engine exhaust oxidation catalysts. More specifically, an aspect of the present disclosure provides a method for producing an inhibition-free PdCu alloy oxidation catalyst for the treatment of low-temperature engine exhaust gas.

Although the present disclosure will be described in terms of specific aspects, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Transportation is one of the major causes of global warming. Around 28.5% of greenhouse gas emissions are from the transportation sector. To further improve the fuel economy and reduce greenhouse gas emissions, new Corporate Average Fuel Economy Standards (CAFE) and Greenhouse Gas Standards have been proposed by the National Highway Traffic Safety Administration and the Environmental Protection Agency (EPA). An approach to achieve higher fuel efficiency requires advanced combustion technologies, which in turn leads to lower engine exhaust temperatures. Popular examples of such engine technologies are diesel and advanced compression ignition (ACI) engines, but other approaches exist. The lower exhaust temperature poses new challenges to the catalytic converter in the conventional after-treatment system, which requires elevated temperatures for optimal operation. Moreover, emission regulations for different pollutant species (CO, $NO_R$, hydrocarbons, etc.) are becoming increasingly stringent. The combination of these factors establishes the need for improved emission control technologies for the after-treatment system.

The first component of the after-treatment system in vehicles equipped with diesel, advanced compression ignition (ACI) engines, or any other engine technology emitting low-temperature exhaust gas is typically an oxidation catalyst (OC), which is used for the oxidation of CO, NO, and hydrocarbons. In addition to pollution abatement, the exothermic nature of the reaction increases the operating temperature and, consequently, in the case of diesel engines, the performance of the downstream diesel particulate filter and selective catalytic reduction modules.

A commonly used OC is comprised of supported Pt and/or Pd on high surface area oxide, e.g., $\gamma$-$Al_2O_3$ or $CeO_2$. Bimetallic Pt—Pd alloys are commonly used due to their excellent high temperature activity for CO, NO, and hydrocarbon oxidation. It has also been shown that the addition of Pd to Pt improves the thermal stability of the catalyst. However, at the lower exhaust temperature of 150° C., the activity of traditional Pt and Pd alloys is greatly reduced. In addition to the lower exhaust temperature, advanced combustion technologies result in elevated levels of CO and hydrocarbons in the exhaust. The CO, NO, and hydrocarbon oxidation reactions on Pt- and Pd-based catalysts exhibit self-inhibition and mutual inhibition due to the competition for adsorption sites. This competitive adsorption has an adverse effect on catalyst performance and shifts the oxidation light-off to higher temperatures.

A PdCu alloy is discovered to not only achieve good activity at reduced temperature but also prevent mutual inhibition between CO and NO oxidation. In various aspects, bimetallic PdCu catalysts with PdCu molar ratios from about 100:1 to about 1:100, but preferably from about 5:1 to about 1:5, and for example, about a 1:1 mol ratio may be prepared via a strong electrostatic adsorption method on $SiO_2$ support. For one method of synthesis, about 5 g of silica gel may be mixed with about 45 mL of water (18.2Ω) and about 4 mL of ammonium hydroxide solution. The palladium nitrate and copper nitrate precursor may be dissolved in about 5 mL of water, to which about 4 mL of ammonium hydroxide solution may be added. The solution of metal ammine nitrate precursors may be added to silica under vigorous stirring. In various aspects, the range of the precursor in the preparation solution may be from approximately 1 ppm to 1 M metal in water. For example, a range between 10 mg/L to 1 g/L metal in water may be used. The mixture may be stirred for about 1 hour, and the solids separated from the liquid by vacuum filtration. In various aspects, the mixture may be stirred in the range of between approximately 1 minute to 24 hours. The retentate may be washed with about 100 mL of water and then dried under ambient air pressure at about 90° C. for 1 about 6 hours. Portions of the dried solids may be then treated for about 4 hours under flowing air (about 100 ml/min-g) in a tubular furnace at about 350° C. (for PdCu/SiO$_2$) or 500° C. (for PtPd/SiO$_2$) with a ramp rate of 5° C./min. In various aspects, the temperature for the heat treatment may be in the range of approximately 80° C. to 1000° C. In various aspects, the alloy samples may be prepared to have the same 2 wt % Pd atoms loading, i.e., PdCu/SiO$_2$ has a total metal weight loading of about 3.2 wt %, PtPd/SiO$_2$ has a metal weight loading of about 5.7 wt %. In various aspects, the ratio of Pd to Cu may range from about 1:100 to about 100:1, and the loading of metal may range from about 0.01% to about 20%.

Temperature programmed oxidation (TPO) experiments were conducted to evaluate the light off behavior and activity of catalyst samples. For each activity test, 29.3 mg of catalyst was used. The catalyst powders were pressed and sieved to be in the size range of about 250-425 μm and were mixed with about 215 mg quartz particles within the same size range. The mixed powder was placed in a quartz tube with an inner diameter of about 4 mm and an outer diameter of about 6.35 mm, forming a catalyst bed of approximately 1.5 cm in length. Quartz wool was placed on both sides of the catalyst mixture to keep it in place. The quartz tube was placed in a furnace, which was used to control the reaction temperature. A thermocouple was placed around 2 cm upstream of the catalyst sample to measure the inlet gas temperature.

Pretreatment was conducted before each TPO test. This process consists of three steps: (i) heat the catalyst bed from room temperature to 400° C. with a 10° C./min ramping rate in 10% O$_2$ and 90% N$_2$, (ii) hold at 400° C. for 10 min in 10% O$_2$ and 90% N$_2$, and (iii) switch to 5% H$_2$ and 95% N$_2$ and continue holding the temperature at 400° C. for another 20 min. In various aspects, the pretreatment atmosphere may include inert, reducing, or oxidizing atmospheres and/or any sequence thereof. In various aspects, the atmosphere includes first an oxidizing pretreatment in the air followed by a purge and then a reductive pretreatment in hydrogen. In various aspects, the flow ranges from approximately 0 cm$^3$/min*g to about 1000 m$^3$/min*g. During the TPO evaluation, the temperature was ramped from room temperature to about 500° C. at about 10° C./min. The inlet gas contained 10% O$_2$, 0 or about 500 ppm CO, 0 or about 200 ppm NO, 0 or 1,000 ppm propylene, 0 or about 2% water vapor, and N$_2$ was used as balance. Water was dosed using a water vaporizer and then carried into the gas stream by N$_2$. A constant flow rate of about 200 mL/min was maintained, which corresponds to GHSV of around 287,000 h$^{-1}$ on a powder basis (50,000 h$^{-1}$ monolith space velocity for a monolith with about 2 g/in$^3$ washcoat loading). One catalyst sample was used for seven consecutive TPO tests: CO oxidation, NO oxidation, CO and NO co-oxidation, CO oxidation, propylene oxidation, CO and propylene co-oxidation, and CO oxidation. The first and last CO oxidation results showed good repeatability, which indicates stable performance and no notable deactivation over the course of the experiments.

Figure 2:
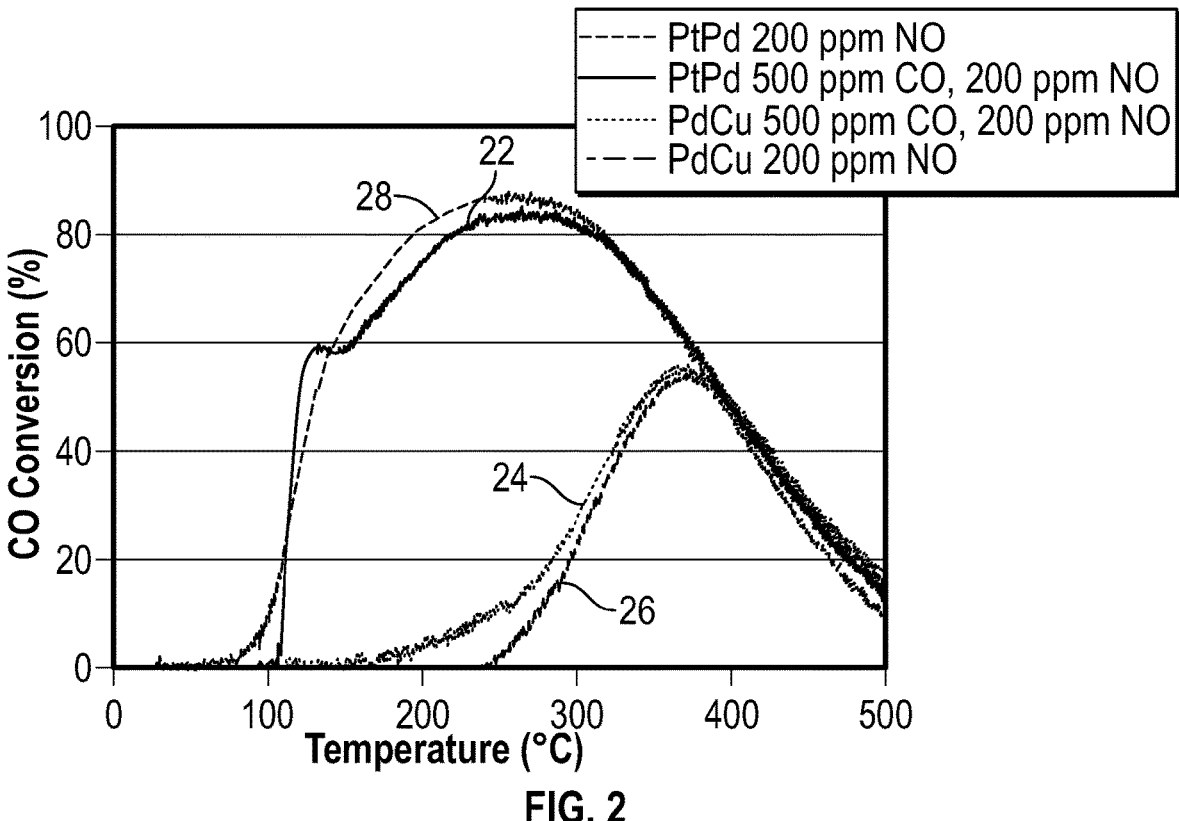
FIG. 2 is a graph of NO conversion over $PdCu/SiO_2$ and $PtPd/SiO_2$ catalysts, in accordance with the present disclosure.

Referring to FIGS. 1 and 2, CO conversion (FIG. 1) and NO conversion (FIG. 2) as a function of temperature over PdCu/SiO$_2$ 14, 16, 24, 26 and PtPd/SiO$_2$ 12, 18, 22, 28 catalysts are shown. The feed gas may contain 0, 28, 26 or 500 12, 14, 16, 18, 22, 24 ppm of CO, 0, 12, 16 or 200 14, 18, 22, 24, 26, 28 ppm of NO, 10% O$_2$, balance with N$_2$ at GSHV 287,000 h$^{-1}$ on a powder basis.

The individual CO and simultaneous CO and NO oxidation light-off curves for 1:1 PdCu/SiO$_2$ are shown in FIG. 1. The light-off experiments have shown that a 1:1 Pt:Pd ratio gives the best performance for CO oxidation, and the results are compared to a PtPd/SiO$_2$ catalyst with 1:1 Pt:Pd ratio. When only CO is oxidized, the PtPd alloy shows better oxidation activity than the PdCu alloy. As shown in FIG. 1, the temperature to achieve 50% conversion (T$_{50}$) for CO oxidation is 98° C. on the PtPd sample, while the T$_{50}$ is 105° C. on PdCu; however, upon the introduction of NO, the T$_{50}$ for PtPd shifts from 98° C. to 110° C. This decrease in activity is well known and attributed to the competition for active sites between CO and NO. Surprisingly, the CO oxidation light-off curve for PdCu shifts to a slightly lower temperature upon the addition of NO. The absence of NO inhibition on CO oxidation for PdCu is congruent with a microkinetic model, which predicts that PdCu falls into the region where CO and NO promote each other's oxidation. While PtPd/SiO$_2$ has a lower T$_{50}$ than PdCu/SiO$_2$ for CO oxidation in the absence of NO, PdCu/SiO$_2$ outperforms the PtPd/SiO$_2$ sample when CO and NO are both present. Ultimately, the absence of mutual inhibition makes PdCu/SiO$_2$ a more suitable catalyst than PtPd/SiO$_2$ for CO oxidation in the context of low-temperature engine emission treatment.

Similarly, FIG. 2 shows that NO oxidation over PdCu is weakly promoted when CO is added to the feed, and the same maximum NO to NO$_2$ conversion of ~55% is reached at 365° C. for both reaction conditions. At higher temperatures, NO conversion begins to decrease with increasing temperature due to the thermodynamic equilibrium of the reaction. In contrast, when CO and NO are simultaneously oxidized on PtPd, NO oxidation is completely suppressed by CO below about 110° C., and a sharp onset of NO oxidation is observed when ca. 50% of CO is converted to CO2. The most probable explanation for this sharp increase is that NO molecules are only able to access active surface sites after the strongly bound CO molecules are oxidized and removed. In addition to the higher onset temperature for NO light-off, the maximum NO conversion decreases by 5% when CO is present in the feed. Thus, the expected outcome is that NO oxidation is suppressed by CO on PtPd. Nevertheless, despite the CO inhibition effect, PtPd, with a lower light-off temperature and higher achieved maximum NO to NO$_2$ conversion, is the better catalyst for low temperature NO oxidation than PdCu. Based on the results, it can be concluded that PdCu and PtPd have their own individual advantages: PdCu is a remarkably active catalyst for uninhibited low-temperature CO oxidation, whereas PtPd is much more efficient for NO oxidation.

FIG. 3 shows a table of EXAFS fits of reduced PdCu/SiO$_2$ catalyst.

Figure 4:
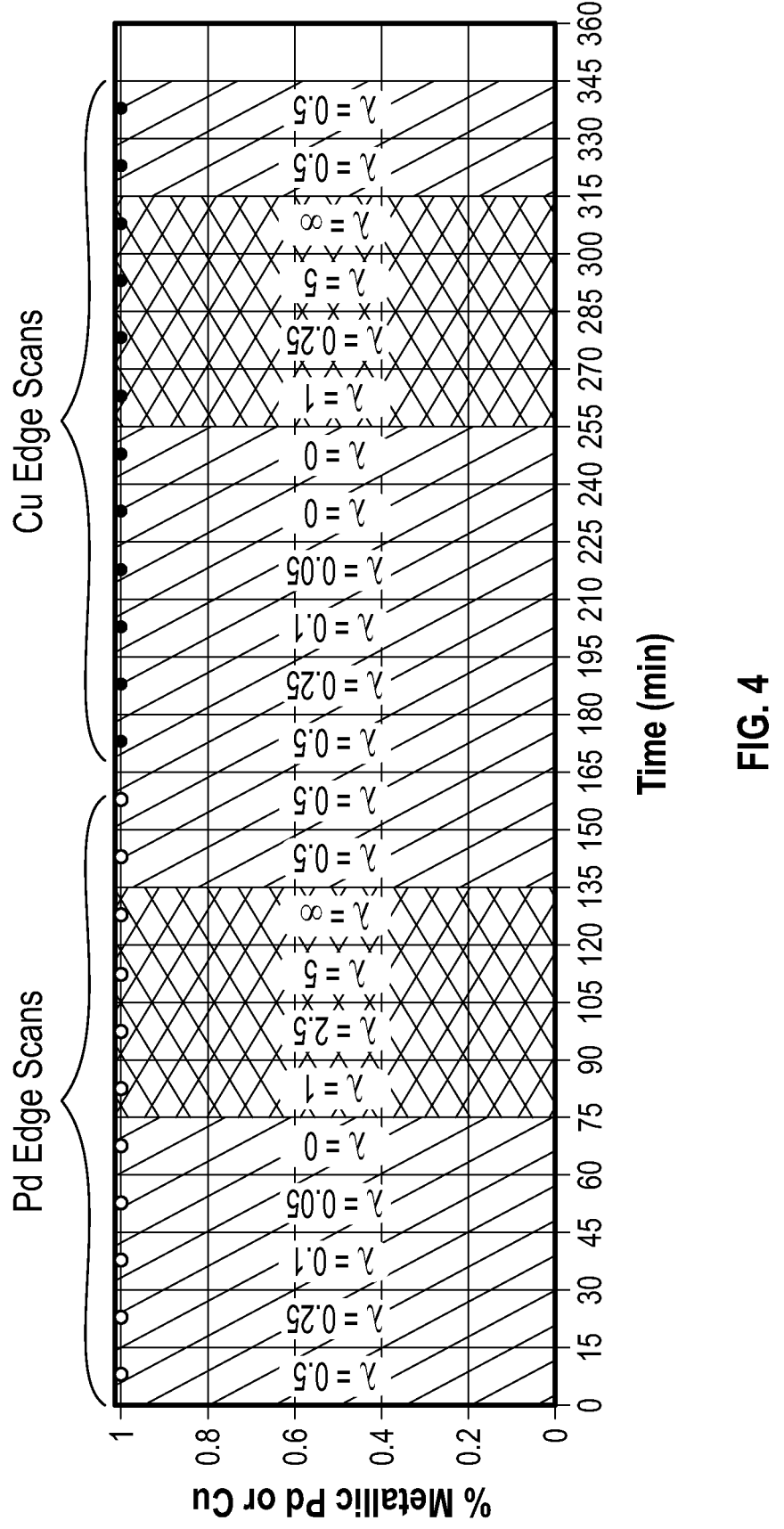
FIG. 4 is a graph showing the effects of redox cycling on the oxidation state of the PdCu catalyst, in accordance with the present disclosure.
Figure 5:
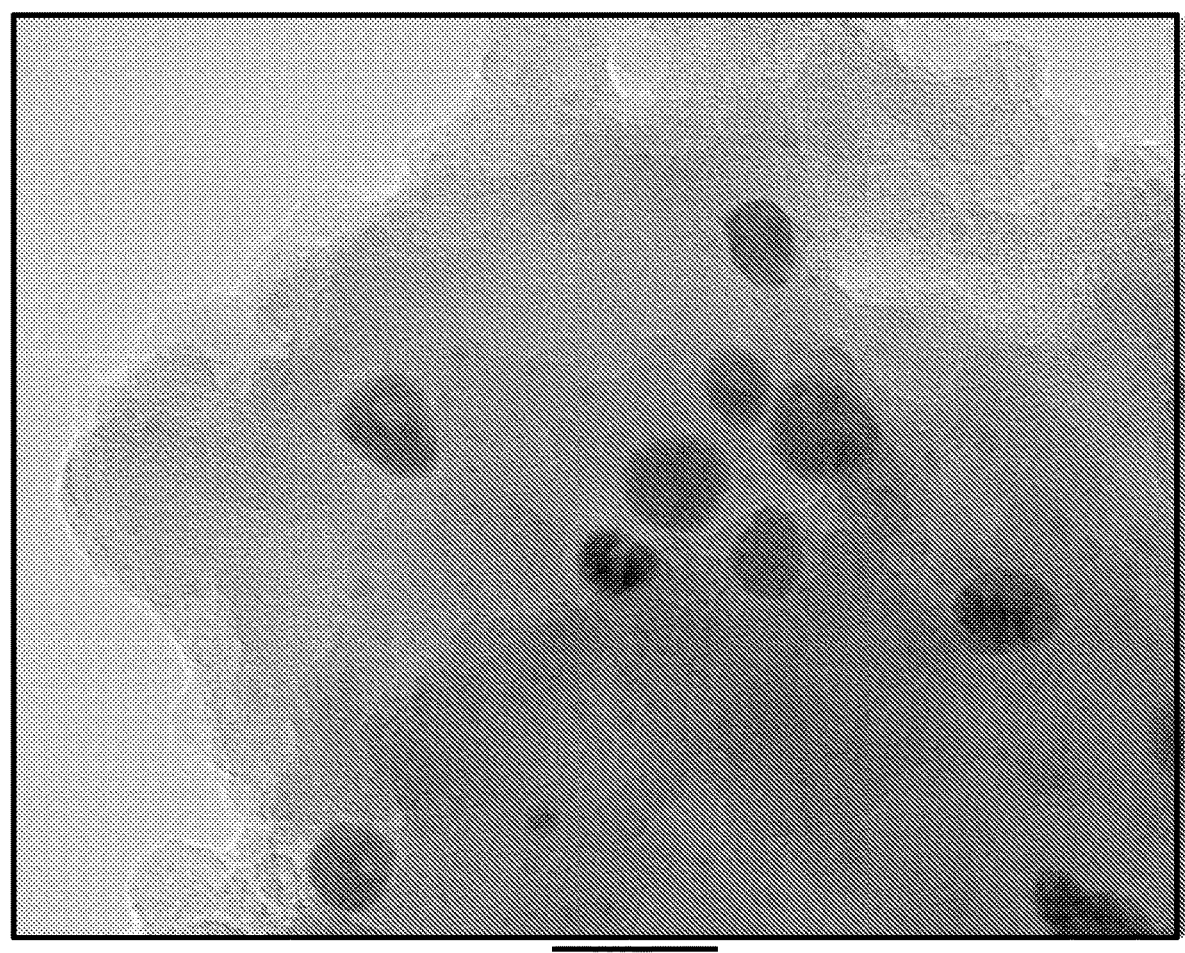
FIG. 5 is a representative transmission electron microscopy image of $PdCu/SiO_2$ catalyst, in accordance with the present disclosure.

Referring to FIG. 4, the effects of redox cycling on the oxidation state of the PdCu catalyst, as determined by operando X-ray Absorption Near Edge Spectroscopy (XANES), are shown in accordance with the present disclosure. Operando XANES is an analytical technique used to elucidate the local electronic structure of an atom as it evolves throughout a reaction or electrochemical process. One of skill in the art would understand how to use operando XANES.

The active site is a Cu-rich surface that surrounds a Pd-rich core. A series of XAS measurements after the reduction of the catalyst was performed. On the Pd edge, fully coordinated metallic Pd, with the total Pd-M coordination number equal to 12, was observed. On the Cu edge, mostly undercoordinated Cu, with the total coordination number equal to 8.5, was observed. This is consistent with a Cu-rich surface on top of a Pd-rich nanocluster core.

In addition to the measurements of the reduced catalyst, the state of the catalyst under reaction conditions was examined, cycling between different equivalence ratios at 300° C. Strikingly, and contrary to earlier studies on monometallic Pd catalysts and bimetallic NiCu catalysts, the PdCu alloy did not show evidence of oxidation either on the Pd or the Cu edges. The alloying of Pd and Cu reduces their chemical potential and hence prevents oxidation of either element. In analogy with the behavior of PdPt alloys, in which Pt prevents the oxidation of Pd, the persistence of the metallic phases ensures the high activity of the catalyst.

Transmission electron microscopy (TEM) experiments were performed using a microscope operated at 300 kV. X-ray absorption spectroscopy measurements were carried out at the Pd and Cu K edges, 24350 eV, and 8980 eV, respectively. Operando measurements were performed at beamline 2-2 of SSRL using cell and high-strength polyimide tubes (OD 3 mm). The $PdCu/SiO_2$ catalyst was reduced at 400° C. prior to reaction, and redox cycling under CO and $O_2$ flow was performed at 300° C. The formation of CO2 was monitored via a mass spectrometer.

XAS measurements of the passivated catalyst were performed at beamline 5BM-D of the Advanced Photon Source. Experiments were carried out in transmission mode using a six-well sample holder ("shooter") placed in a quartz tube. This tube was heated by an electric furnace, and the gas environment was controlled by mass flow controllers flowing $H_2$, $O_2$, and He via three-way valves welded to fittings with polyimide windows.

Figure 6:
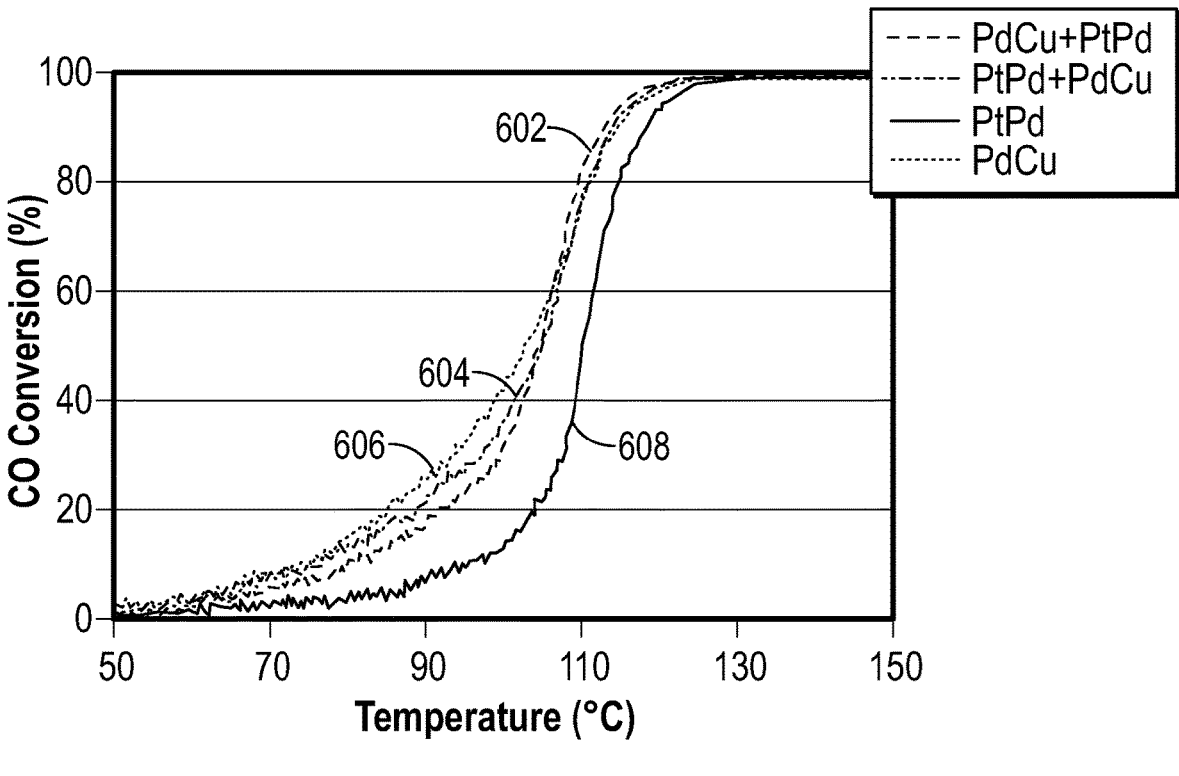
FIG. 6 is a graph of carbon monoxide (CO) conversion as a function of temperature over $PdCu/SiO_2$, $PtPd/SiO_2$, PdCu+PtPd dual-bed configuration, and PtPt+PdCu dual-bed configuration, in accordance with the present disclosure.
Figure 7:
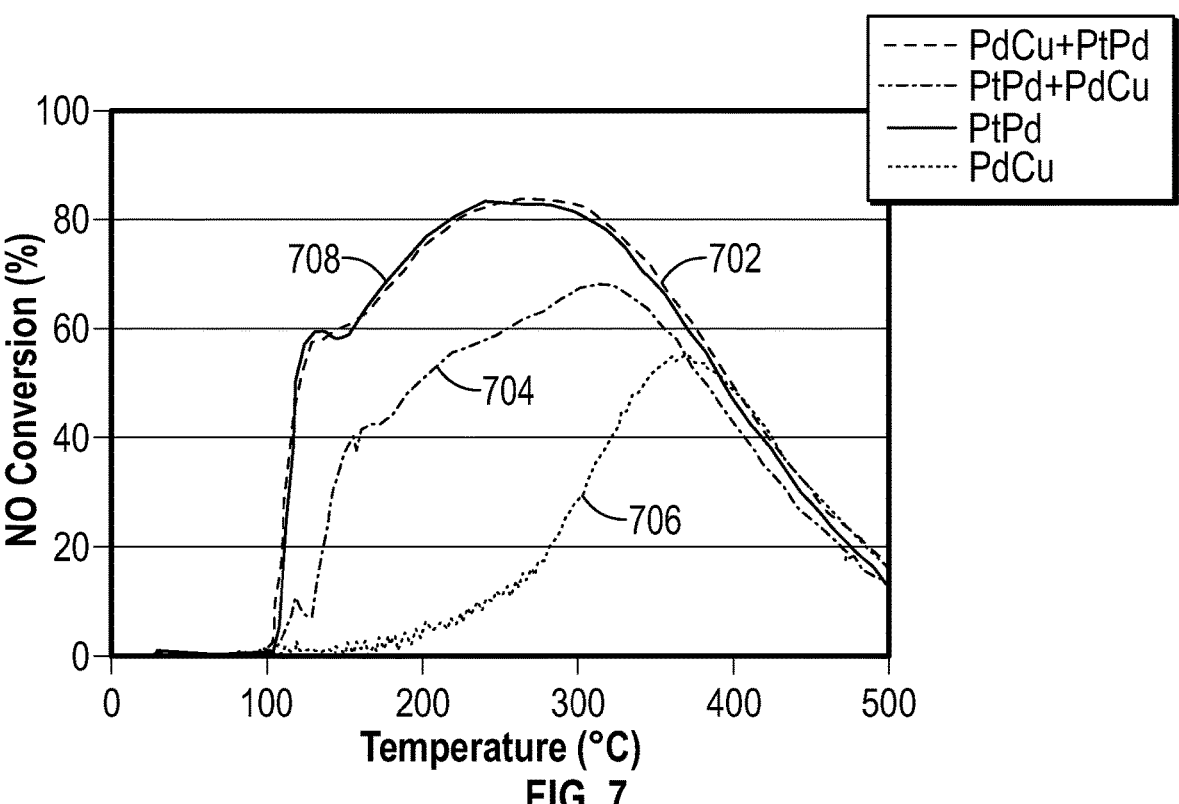
FIG. 7 is a graph of NO conversion as a function of temperature over $PdCu/SiO_2$, $PtPd/SiO_2$, PdCu+PtPd dual-bed configuration, and PtPt+PdCu dual-bed configuration, in accordance with the present disclosure.
Figures 8, 9:
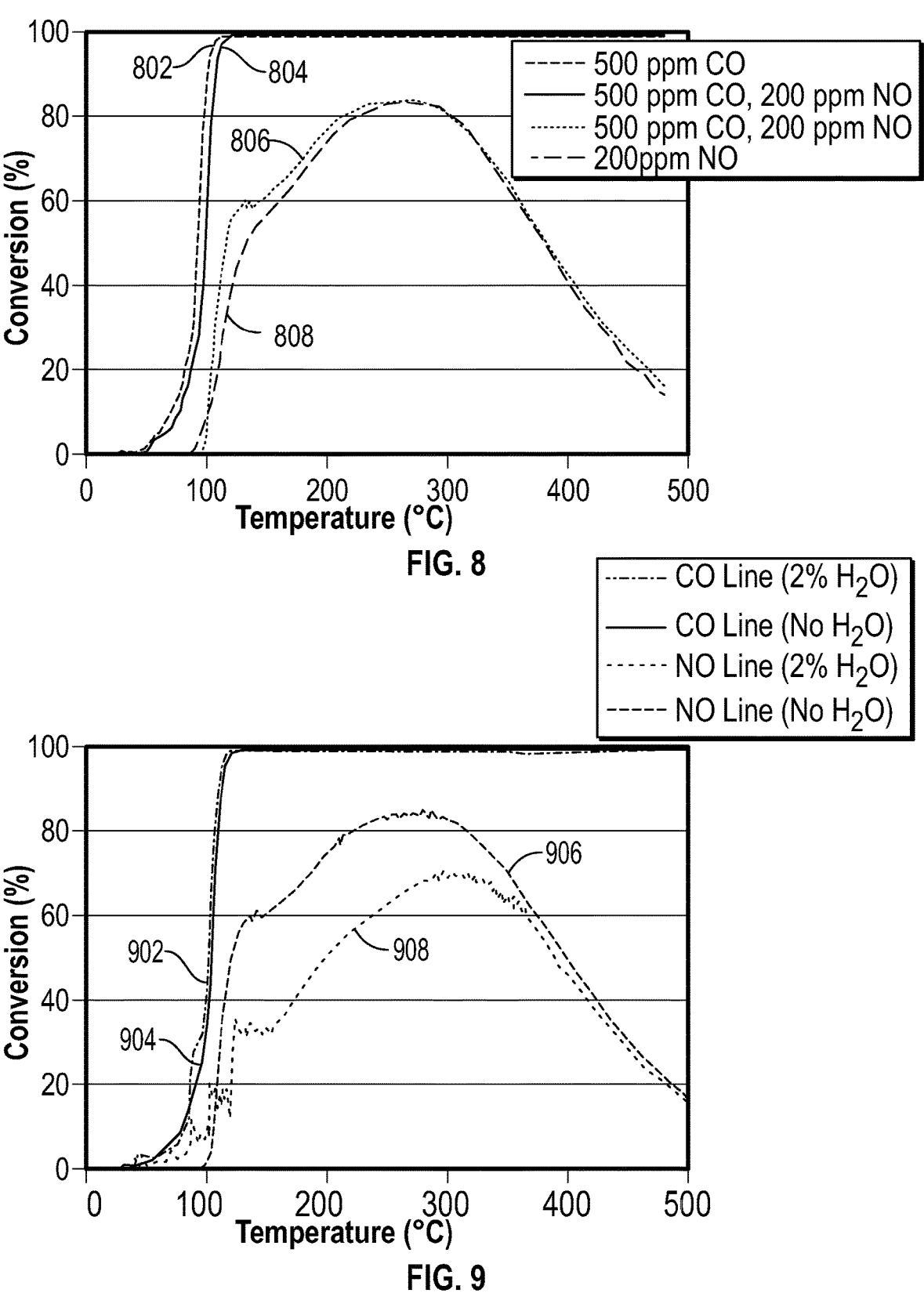
FIG. 8 is a graph of CO conversion and NO conversion as a function of T over the PdCu+PtPd dual-bed catalyst configuration, in accordance with the present disclosure.
FIG. 9 is a graph of CO conversion and NO conversion as a function of temperature with and without $H_2O$ over the PdCu+PtPd dual-bed catalyst configuration, in accordance with the present disclosure.

Based on the aforementioned activity advantages of PdCu for the oxidation of CO and PdPt for the oxidation of NO, the sequential loading of the two catalysts in the same reactor suggests itself as a strategy to leverage the distinct advantages of each catalyst. In various aspects, the range of catalyst loading may include from approximately 0.1% metal/support to 50% metal/support. Thus, experiments with the sequential catalyst bed configuration were performed while keeping the overall molar amount of metal atoms constant and choosing a consistent total mass loading. The mass ratio of PdCu:PtPd in the catalysts mixtures is 1:1. The PdCu and PtPd samples are separated by quartz wool. The performance of sequentially loaded PdCu and PtPd alloy are shown in FIG. 6 and FIG. 7, where curves 602, 702 show the results when PdCu is placed upstream of PtPd. The notation PdCu+PtPd is used to represent this configuration in the following discussion. The low-temperature activity for CO and NO co-oxidation over the PdCu+PtPd composite outperforms either PdCu or PtPd alloy alone. Notably, the CO oxidation behavior for PdCu+PtPd 602 in FIG. 6 mirrors that on the PdCu alloy 606, while at the same time, PdCu+PtPd 702 shows practically identical NO oxidation performance as measured for PtPd 708 in FIG. 7. This outcome is expected, assuming that complete CO oxidation occurs without NO inhibition in the upstream PdCu section 706, followed by NO oxidation in the absence of CO occurring in the downstream PtPd 708 section. FIG. 8 provides additional support for the assertion that CO is fully removed from the gas phase past the PdCu section, as no CO inhibition is observed for NO oxidation when CO and NO are simultaneously introduced into the reactor. Once CO is removed from the stream, the downstream PtPd catalyst is able to oxidize NO more effectively. Overall, the sequential PdCu+ PtPd composite shows a synergistic effect such that it has better oxidation performance than either of its two constituent alloy catalyst components.

Referring again to FIGS. 6 and 7, CO conversion (FIG. 6) and NO conversion (FIG. 7) as a function of temperature over $PdCu/SiO_2$ 606, 706, $PtPd/SiO_2$ 608, 708, PdCu+PtPd dual-bed 602, 702, and PtPd+PdCu dual-bed 604, 704 is shown. The feed contains 500 ppm of CO, 200 ppm of NO, 10% $O_2$, balance with $N_2$ at GSHV≈287,000 $h^{-1}$ on a powder basis.

Referring again to FIG. 8, CO conversion 802, 804 and NO conversion 806, 808 are shown as a function of T over the PdCu+PtPd dual-bed catalyst configuration. The feed contains 10% $O_2$, noted CO and NO concentrations, balance with $N_2$ at GSHV≈287,000 $h^{-1}$ on a powder basis.

To further support the roles of each component, the CO and NO co-oxidation performance was examined on a PtPd+PdCu catalyst bed configuration in which PtPd is loaded upstream of PdCu. The PtPd and PdCu loadings are the same as in the previously discussed PdCu+PtPd composite. As graphed in FIG. 6, the CO oxidation behavior for PdCu containing catalysts, i.e., PdCu, PdCu+PtPd, and PtPd+PdCu, is essentially indistinguishable. Since CO oxidation over PdCu is not affected by NO, the placement of PdCu along the reactor is expected to be irrelevant. Marked differences, however, are observed for NO oxidation in FIG. 7. When PtPd is loaded in front of PdCu, the resulting NO oxidation activity is greatly reduced compared to the reverse loading (PdCu+PtPd) and even the single bed PtPd configuration. The maximum NO to $NO_2$ conversion for PtPd+PdCu decreases to 69%. The poor NO oxidation activity of PtPd+ PdCu may be attributed to two reasons: first, CO is not removed from the stream, therefore CO inhibition exists. Second, the PtPd+PdCu composite contains only half the amount of PtPd. Overall, the results obtained after reversing the loading sequence further support that CO is oxidized by PdCu without NO inhibition, and the primary role of PtPd is to oxidize NO.

Water is one of the primary exhaust gas components and is known to act as an inhibitor to the standard OC based on PtPd. Because of this, any practical catalyst must possess robust performance when exposed to water. To mimic emission conditions closer to reality, about 2% water was added to the feed stream and studied the effect of water on the performance of the dual-bed PdCu+PtPd system. The results plotted in FIG. 9 show that CO conversion as a function of temperature with and without water exhibits indistinguishable performance; however, $H_2O$ impacts the NO oxidation negatively, and the maximum NO to $NO_2$ conversion decreases to 70%. Since CO and NO are oxidized by PdCu and PtPd, respectively, the PdCu alloy is agnostic to the presence of $H_2O$, while PtPd suffers from deactivation when $H_2O$ is present. Decreased NO conversion in the presence of $H_2O$ was also observed on $Pt/Al_2O_3$ catalyst in previous literature and was attributed to the decreased surface area in the presence of water.

Referring to FIG. 9, CO conversion 902, 904 and NO conversion 906, 908 as a function of temperature with 902, 908 and without 904, 906 $H_2O$ over the PdCu+PtPd dual-bed catalyst configuration are shown in accordance with the present disclosure. The feed gas contains 500 ppm of CO, 200 ppm of NO, 0% 904, 906 or 2% 902, 908 $H_2O$, 10% $O_2$, balance with $N_2$ at GSHV≈287,000 $h^{-1}$ on a powder basis.

Figure 10:
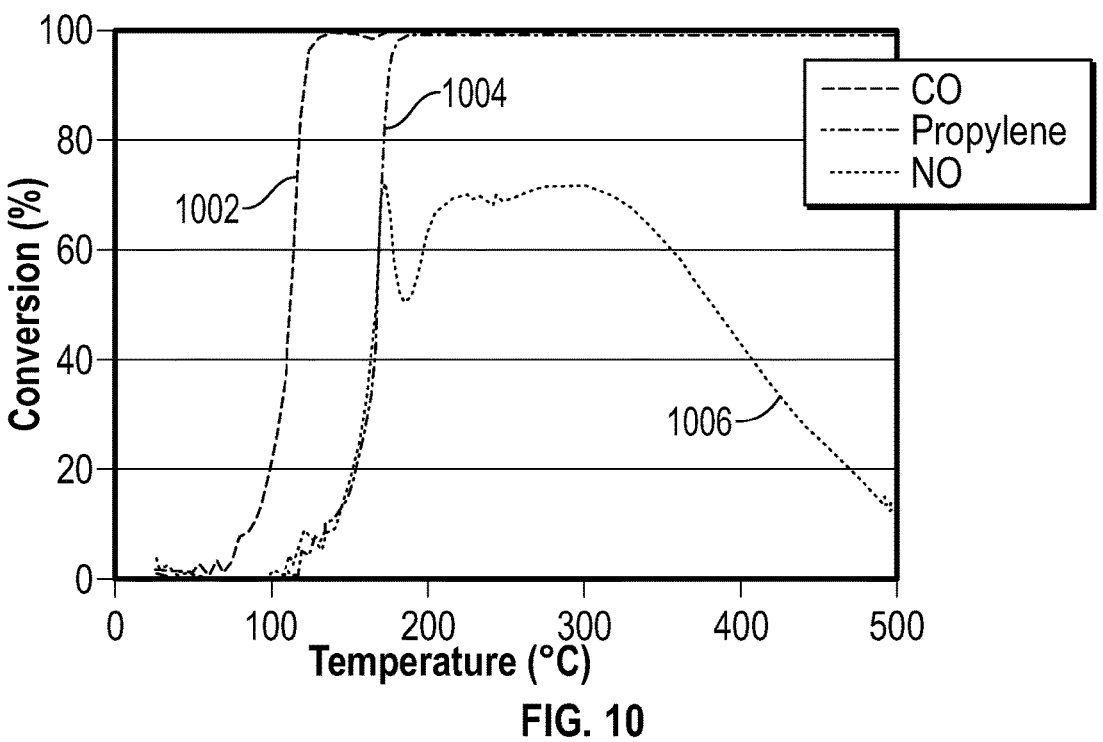
FIG. 10 is a graph of conversions of CO, NO, and propylene as a function of temperature over the PdCu+PtPd dual-bed catalyst configuration, in accordance with the present disclosure.

Inhibition effects are observed when propylene, a surrogate for unburnt hydrocarbons, is co-fed with CO and NO. As shown in FIG. 10, the $T_{50}$ for CO oxidation increases from 105° C. to 112° C. once 1,000 ppm of propylene is introduced into the feed stream; however, CO oxidation still occurs and completes below the target temperature of 150° C. This suggests that this dual-bed catalyst configuration is a promising solution for CO oxidation under realistic automotive exhaust conditions.

The onset for NO and propylene oxidation overlaps and occurs right after CO has been oxidized. Presumably, CO inhibits propylene oxidation, which in turn is kinetically linked to NO oxidation. A detailed analysis of the two NO oxidation peaks in FIG. 11 reveals that the first peak corresponds to NO reduction to $N_2O$ and $N_2$, while the second peak corresponds to $NO_2$ production. It is likely that NO acts as an oxidant and reacts with propylene. In agreement with the scientific literature for $Pt/Al_2O_3$ catalysts, it is observed that no $NO_2$ is produced before propylene is completely oxidized. This is because $NO_2$ is a stronger oxidant than $O_2$. Therefore, any produced $NO_2$ will be immediately reduced by propylene. Thus, NO and hydrocarbon oxidation reactions remain challenging for complex feed compositions. Despite these unsolved challenges for NO and hydrocarbon oxidation, the PdCu+PtPd dual-bed OC leads to several practical improvements: (i) the low-temperature CO oxidation challenge is solved; (ii) the new catalyst formulation outperforms the reference PtPd alloy with less PtPd loading, and (iii) Cu is less expensive. Reducing the amount of platinum group metals (PGM) combined with a simple, sequential dual-bed configuration reduces the manufacturing cost of the catalytic converter substantially, while at the same time, its activity is improved.

Referring to FIG. 10, conversions of CO 1002, NO 1006, and propylene 1004 as a function of temperature over the PdCu+PtPd dual-bed catalyst configuration are shown in accordance with the present disclosure. The feed gas contains 500 ppm of CO, 200 ppm of NO, 1000 ppm of propylene, 10% $O_2$, balance with $N_2$ at GSHV≈287,000 $h^{-1}$ on a powder basis.

Figure 11:
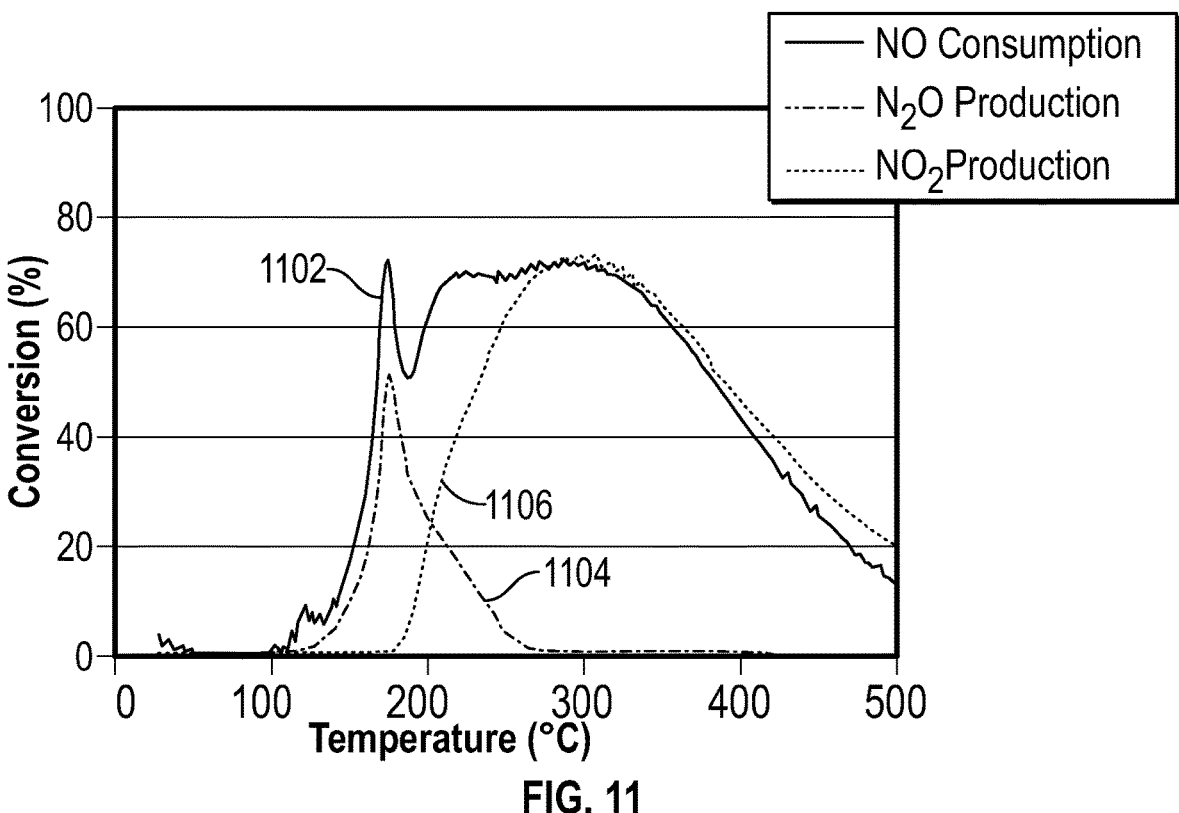
FIG. 11 is a graph of total NO conversion, the conversion of NO to form $N_2O$, and the conversion of NO to form $NO_2$ as a function of T over the PdCu+PtPd dual-bed catalyst configuration, in accordance with the present disclosure.

Referring to FIG. 11, total NO conversion 1102, the conversion of NO to form $N_2O$ 1104, and the conversion of NO to form $NO_2$ 1106 as a function of T over the PdCu+PtPd dual-bed catalyst configuration is shown in accordance with the present disclosure. The feed contains 500 ppm of CO, 200 ppm of NO, 1000 ppm of propylene, 10% $O_2$, balance with $N_2$ at GSHV≈287,000 $h^{-1}$.

Figures 12, 13A, 13B:
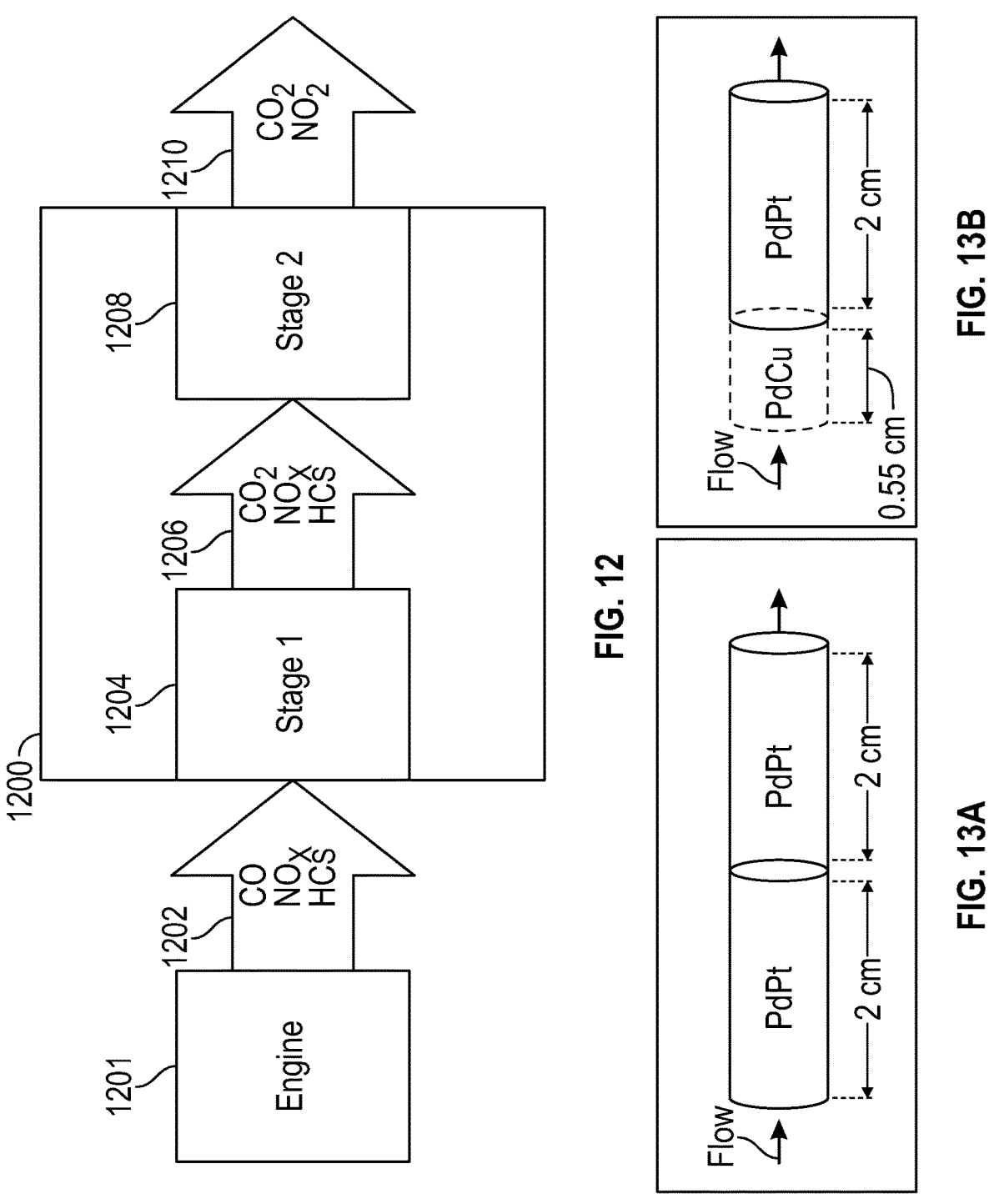
FIG. 12 is a schematic diagram of a system for catalyzing the outflow of engine exhaust gas without explicitly showing the presence of oxygen and water in all stages, in accordance with the present disclosure.
FIG. 13A is a diagram of a PdPt monolithic reactor, in accordance with the present disclosure.
FIG. 13B is a diagram of a reactor using a dual-stage configuration using a PdCu catalyst for the first stage, in accordance with the present disclosure.

Referring to FIG. 12, a system 1200 for catalyzing the outflow of exhaust gas 1202 of a vehicle engine 1201 is presented in accordance with the disclosure. The system 1200 includes a first stage 1204 including a PdCu alloy configured to oxidize CO. The PdCu alloy is prepared in accordance with the method of this disclosure. In aspects, the PdCu alloy may use an alumina support and/or a silica support. The system 1200 further includes a second stage 1208 including Pt, Pd, or any PGM alloy configured to oxidize NO. It is contemplated that any commercially available catalyst may be used as the second stage 1208. For example, the outflow of exhaust gas 1202 of an engine 1201 is fed into the first stage 1204. The first stage 1204 oxidizes the CO, and the resultant exhaust outflow 1206 is introduced into the second stage 1208. The second stage 1208 oxidizes the NO.

In various aspects, the following metal alloys may be used in addition to Pd/Cu, including coinage metals in Group 11 and oxophilic metals from Group 10, 9 or 8. The coinage metals may have no or minimal inhibition of CO oxidation in the presence of $NO_x$ or hydrocarbons. The alloys may be prepared in similar ratios as the Pd:Cu alloy ranging from approximately 1:100 to 100:1, for example, from 3:1 to 1:3. In various aspects, the coinage metals from Group 11 in the periodic table may be alloyed with an oxophilic metal from Group 10, 9, or 8. The coinage metals in Group 11 include: Cu, Ag, Au. Oxophilic metals may include Group 10: Ni, Pd, Pt, Group 9: Co, Rh, Ir, and Group 8: Fe, Ru.

In various aspects, a sequential (series) configuration of the two catalysts may be used. For the sequential (series) configuration of the two catalysts, the first oxidation catalyst may include the alloy of a Group 10 coinage metal (Cu, Ag, Au) with a metal from Group 10, 9, or 8 (Ni, Pd, Pt, Co, Rh, Ir, Fe, Ru). The second catalyst downstream may include any automotive oxidation catalyst (OC) that usually suffers from CO poisoning. This includes all commercial diesel OCs based on Pt, Pd and their alloys.

Referring to FIGS. 13A-16, experimental data comparing a PdPt monolithic reactor and a reactor using a dual-stage configuration using a PdCu catalyst for the first stage is shown.

FIG. 13A shows a block diagram of a PdPt monolithic reactor, in accordance with the present disclosure. The baseline catalyst contained about 0.5 wt. % Pd+0.5 wt. % $Pt/Al_2O_3$ (85%) $CeO_2$ (15%) wash coated (wc) onto a monolith with 1.5 g $wc/in^3$. Two monolithic cores of about 2 cm length each and 8×8 channels (400 CPSI=channels per square inch) were used. The total platinum group metal (PGM=Pd+Pt) content for the two cores is 3.77 mg (~1.89 mg each)

FIG. 13B shows a diagram of a reactor using a dual-stage configuration using a PdCu catalyst for the first stage, in accordance with the present disclosure. The PdCu alloy catalyst was prepared with about 2 wt. % Pd+1.2 wt. % $Cu/SiO_2$ (90%), $Al_2O_3$ (10%) wash coated onto a monolith with 3.0 g $wc/in^3$. Washcoating of the monolith was done in a two-step process of milling and dip-coating. The catalyst powder was mixed with water and colloidal alumina sol (20% alumina) to give about a 10 wt. % alumina+90 wt. % catalyst mixture. The mixture was milled for about two days to get a uniform solution. Two cordierite monoliths of 400 CPSI, 8×8 channel, and about 2 cm in length were repeatedly dip-coated with the uniform slurry and then air-dried until a loading of 3 g $wc/in^3$ was achieved. One monolith was used as-is, and the second monolith was cut down to 0.55 cm length to match the total PGM loading of the 2 cm monolith catalyst.

Before the start of each new experiment, the catalyst sample was pre-treated. The catalyst was heated at a rate of 10° C./min from 60° C. to 400° C. in 34 min in the presence of oxygen at different flow rates, followed by 10 min treatment at 400° C. At low flow rates, the standard concentration of $O_2$ was 5.7%. Due to flow controller limitations, the oxygen concentration was lowered to about 4.6% at 3,217 sccm, and to about 2.85% at 5,148 sccm. Subsequently, oxygen was switched off and the reduction cycle was carried out in presence of about 5% hydrogen at 400° C. for 20 min.

In a typical oxidation experiment, a desired combination of gases is heated from 60° C. to 400° C. in 34 min with a ramp rate of 10° C./min. An initial set of experiments was performed on the PdCu in-house catalyst with a total flow rate of 2,574 sccm (equivalent to a weight hourly space velocity (WHSV) with respect to PGM=22,759,809 $cm^3$ $(g_{PGM}h)^{-1}$, total WHSV=409,680 $cm^3(g_{wc}h)^{-1}$; gas hourly space velocity (GHSV)=75,000 $h^{-1}$).

Since the PGM and total loading of the baseline catalyst and a PdCu alloy catalyst in accordance with the present disclosure are different, three different scenarios were considered to evaluate the effectiveness of the individual and dual-stage experiments. Using the flow rate of the initial experiments with the PdCu alloy catalyst as a basis, the flowrates for constant WHSV and GHSV cases were calculated.

Steady-state oxidation experiments involving CO and CO+NO were conducted using the bench flow reactor system for each flow rate. Temperatures were held constant during steady-state experiments with an increment of about 15° C. between temperatures. The feed gas mixture contains about 500 ppm CO, 200 ppm NO, 5.7% $O_2$ (unless otherwise noted), 3% $H_2O$, and balance Ar. The concentration of effluent gases downstream of the reactor was measured by Fourier transform infrared (FTIR) spectrometry. Data were recorded at steady-state when the effluent concentration remained constant. CO conversion was measured by its disappearance.

Figure 14:
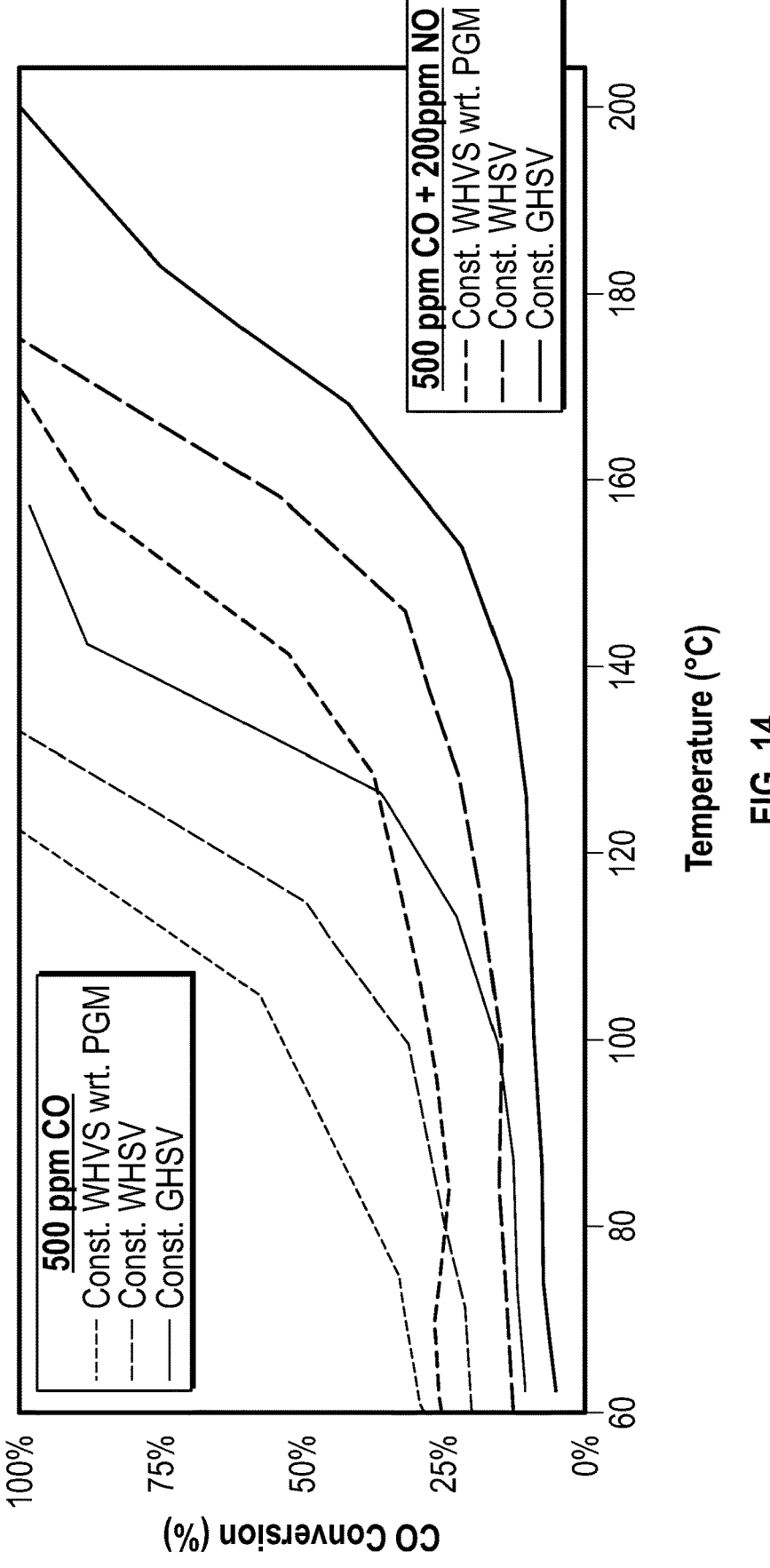
FIG. 14 is a graph depicting NO inhibition on CO oxidation for the reactor of FIG. 13A, in accordance with the present disclosure.

Referring to FIG. 14, a graph depicting NO inhibition on CO oxidation for the reactor of FIG. 13A is shown. A control experiment with the single-stage PdPt catalyst (FIG. 13A) confirms that the CO oxidation activity of the commercial monolith catalyst sample suffers from severe inhibition by NO. The comparison in FIG. 14 shows that the minimum temperature required to reach >50% CO conversion increases between 30-50° C. when 200 ppm of NO is added to the feed. The extent of inhibition depends on the flow rates that were considered in the three cases described in FIG. 17.

Figure 15:
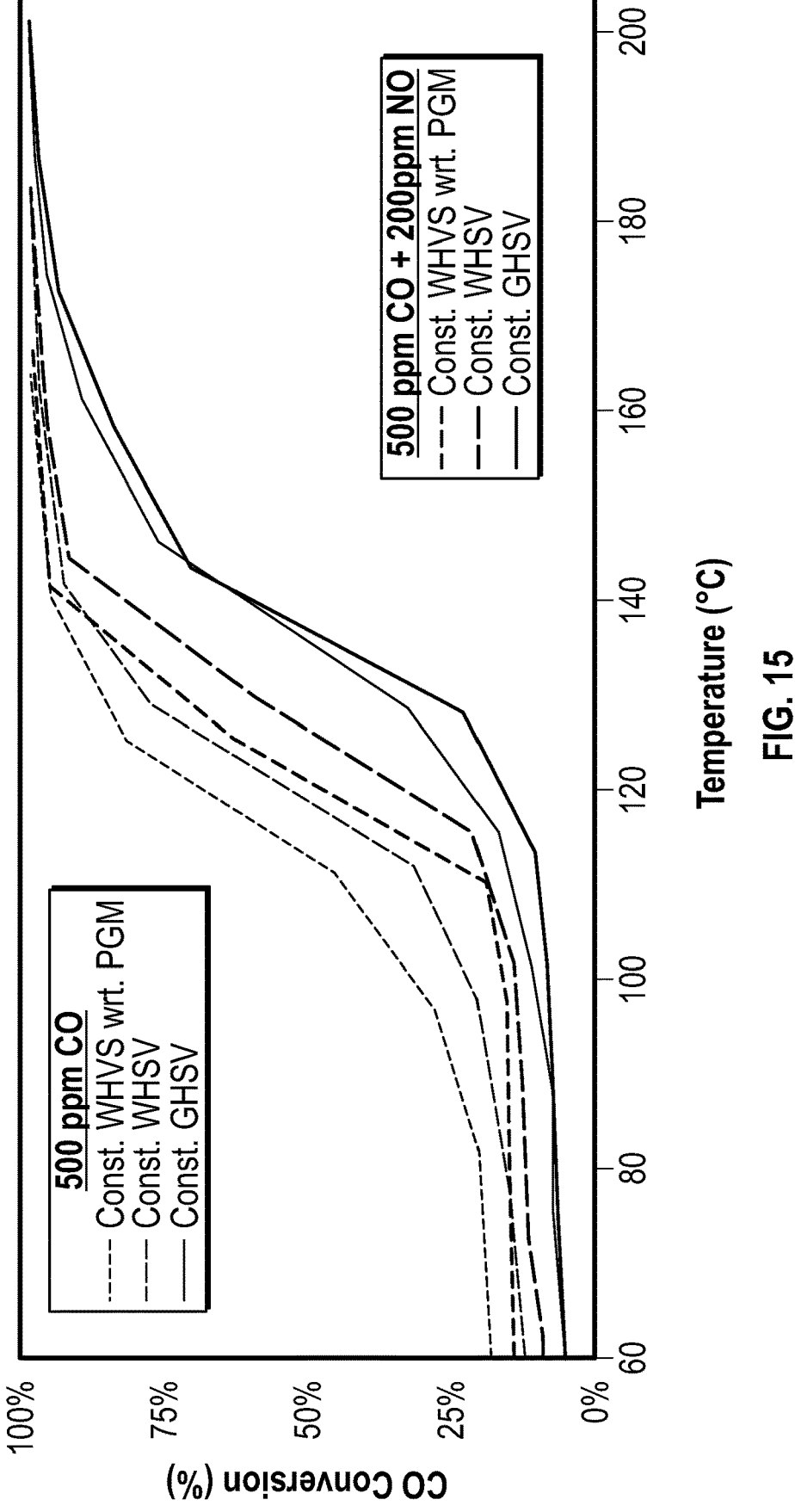
FIG. 15 is a graph depicting the effect of NO on CO oxidation for the reactor of FIG. 13B, in accordance with the present disclosure.

Referring to FIG. 15, a graph depicting the effect of NO on CO oxidation for the reactor of FIG. 13B is shown. The CO oxidation activity of the new two-stage configuration using a PdPt catalyst downstream of a PdCu catalyst (FIG. 13B) is much less sensitive to the presence of NO.

FIG. 15 shows the steady-state CO conversion with and without NO present. In all cases, the inhibition by NO is limited to an increase of the light-off temperature of less than 10° C. temperature increase; at the highest flow rate setting of 3,217 sccm the presence of NO has no significant effect on CO conversion.

Figure 16:
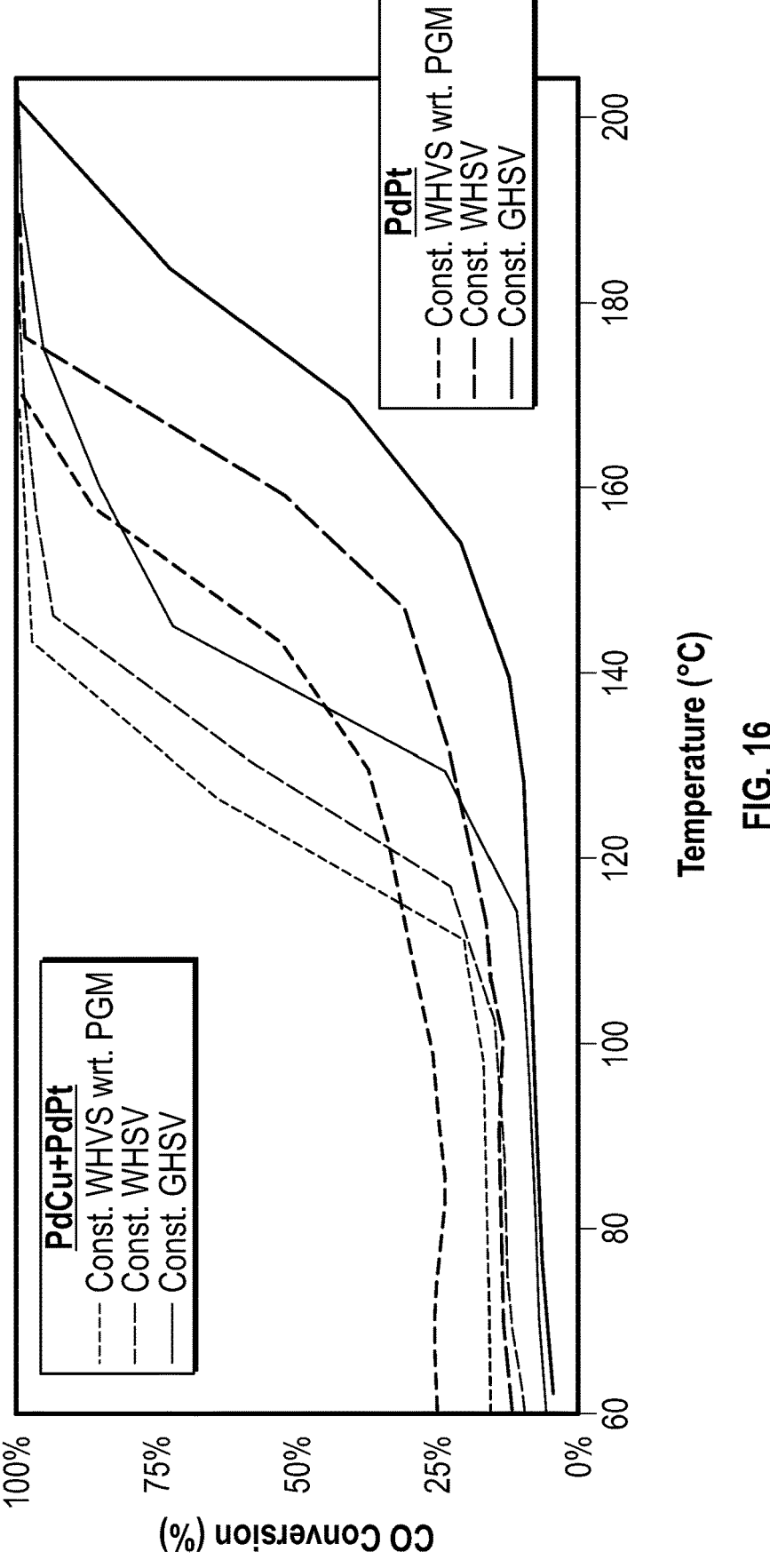
FIG. 16 is a graph depicting a comparison of the reactor of FIG. 13A and the reactor of FIG. 13B, in accordance with the present disclosure.

FIG. 16. is a graph depicting a comparison of the reactor of FIG. 13A and the reactor of FIG. 13B. These NO inhibition studies using wash coated monolith samples confirm the higher resilience of the PdCu containing two-stage system to the presence of NO and is in agreement with measurements using powdered catalyst samples. The benefit of eliminating the inhibition effect of NO on CO oxidation is clearly demonstrated in the juxtaposition of the two catalyst and reactor configurations using a CO and NO containing feed shown in FIG. 16. Comparisons at identical WHSV with respect to PGM weight, WHSV with respect to the total washcoat weight, and GHSV all show that the two stage PdCu+PdPt configuration outperforms the single stage configuration using only PdPt. The result that the two stage PdCu+PdPt configuration reaches nearly complete conversion below 150° C. for the two lower flow rates is remarkable. Even at the highest tested flow rate that keeps the GHSV constant between both configurations, CO conversion reaches ca. 75% at 150° C. In contrast, the single stage PdPt configuration reaches only between 10-70% conversion at 150° C. at all tested flow rates.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A catalyst configured to oxidize CO in the presence of at least one of NO, hydrocarbons, or water, at temperatures lower than 150° C., wherein the catalyst comprises bimetallic Pd—Cu alloy nanoclusters supported on an oxide support.

2. The catalyst of claim 1, wherein Pd and Cu are alloyed at a ratio of 3:1 to 1:3.

3. The catalyst of claim 1, wherein Pd and Cu are alloyed at a ratio of 5:1 to 1:5.

4. The catalyst of claim 1, wherein Pd and Cu are alloyed at a ratio of 100:1 to 1:100.

5. The catalyst of claim 1, wherein the oxide support includes at least one of $SiO_2$, $TiO_2$, $ZrO_2$, $CeO_2$, $Al_2O_3$, MgO, $SnO_2$, $Nb_2O_5$, BaO, SrO, $Fe_2O_3$, $Ta_2O_5$, or $La_2O_3$.

6. The catalyst of claim 1, wherein Pd is substituted at least in part by Pt.

7. The catalyst of claim 1, wherein the catalyst is prepared by a strong electrostatic adsorption method.

8. The catalyst of claim 1, wherein the catalyst is prepared by an incipient wetness impregnation method.

9. A system for removing contaminants from engine exhaust gas, the system comprising:

a first stage including a first catalyst configured to oxidize CO in presence of at least one of NO, hydrocarbons, or water, at temperatures lower than 150° C., wherein the first catalyst comprises bimetallic Pd—Cu alloy nanoclusters supported on an oxide support; and a second stage including a second catalyst configured to oxidize NO and hydrocarbons at a temperature range from 20° C. to 1000° C.

10. The system of claim 9, wherein the second catalyst includes a PdPt bimetallic catalyst.

11. The system of claim 9, wherein the second catalyst includes at least one of a $PdPt/SiO_2$ catalyst or a PdPt/ alumina catalyst.

12. The system of claim 9, wherein Pd and Cu are alloyed at a ratio of 3:1 to 1:3.

* * * * *